Sept. 22, 1925.

G. A. FULLIPS 1,554,805

BOTTLE FILLER

Filed Oct. 9, 1924

Witness!
Erwin B. Eiring

Inventor!
George A. Fullips
By
Attorneys

Patented Sept. 22, 1925.

1,554,805

UNITED STATES PATENT OFFICE.

GEORGE A. FULLIPS, OF MILWAUKEE, WISCONSIN.

BOTTLE FILLER.

Application filed October 9, 1924. Serial No. 742,622.

*To all whom it may concern:*

Be it known that I, GEORGE A. FULLIPS, a citizen of the United States, and resident of Milwaukee, in the county of Milwaukee and State of Wisconsin, have invented certain new and useful Improvements in Bottle Fillers; and I do hereby declare that the following is a full, clear, and exact description thereof.

This invention relates to bottle fillers and although it is applicable to a large number of different uses, it is particularly directed in milk bottle filling machines, such as that disclosed in my co-pending application, Serial No. 680,407, filed Dec. 13, 1923, for machine for filling and capping bottles.

In bottle fillers as heretofore constructed, difficulty has been experienced due to the fact that the bottles were usually raised to the fillers and consequently a considerable interval of time was required and also the bottle was more or less unsteady and frequently tipped over during this operation. In addition to this, the filling devices frequently gave trouble due to the fact that they leaked after the bottle was filled and further they caused considerable frothing and foaming.

This invention is designed to overcome the above noted defects, and objects of such invention are to provide a bottle filler which moves downwardly towards the stationary bottle and from the stationary vat, which is extremely rapid in its operation, which will operate individually upon a single bottle, and which is controlled directly from the bottle so that a gang of these fillers may be employed in a machine and any bottles presented by the machine will actuate their particular fillers while the other fillers remain closed.

Further objects are to provide a bottle filler which is devoid of springs and other weak and unreliable parts, which is so constructed that no leaking or squirting can occur, and which wholly avoids frothing and foaming during the filling operation.

Further objects are to provide a bottle filling device in which a main valve seat is provided and associated with means which adapts itself to the bottle and seals the bottle thoroughly while filling is in progress, and which is provided with an upper valve seat to completely stop any leaking around the movable portions while filling is in progress, and which is provided with a spreader to cause the milk to flow along the inner walls of the bottle, and which is so constructed that the milk trapped in the valve portion is held against leaking although the bottle may have remained under the filler an undue length of time.

Further objects are to provide a milk bottle filler which is so constructed that it is adapted to be individually removed from the milk vat without disturbing the other filling mechanisms, which is of extremely simple and rugged construction, and which is easily kept in a sanitary condition.

An embodiment of the invention is shown in the accompanying drawings, in which:—

In the milk bottling machine a stationary vat 1' for the milk is provided and the bottle 2' is positioned beneath the vat by automatic mechanism such as described in my above noted application.

Figure 1:
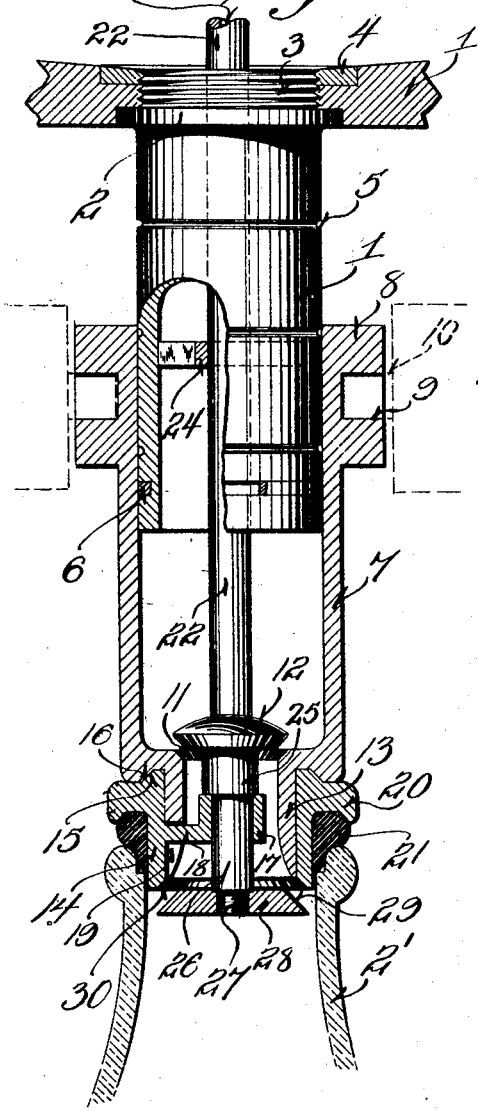
Figure 1 is a vertical elevation partly in section of the bottle filler showing it in filling position with the associated portion of a milk bottle.

The filling device comprises a stationary sleeve 1 which is equipped with a shoulder 2 and with a threaded portion 3 screwed into a threaded aperture in the milk vat. A lock nut of ring type, as indicated at 4, is seated within a correspondingly recessed portion of the milk vat, as shown in Figure 1, and retains the filler securely in position. This sleeve is preferably provided with a plurality of annular grooves 5 which aid in preventing leaking around the sleeve and is provided with a piston ring 6.

A movable sleeve 7 slides over the stationary sleeve 1 and is accurately bored to fit such sleeve. The movable sleeve forms a substantially water tight joint with the stationary sleeve. This slidable sleeve is provided with an annular groove 9 adapted to receive the lugs indicated in dotted lines at 10 of the actuating mechanism. The lower end of the sleeve 7 is inwardly turned and is beveled to provide a valve seat 11 upon which the main valve 12 is adapted to seat. This lower portion is extended downwardly and forms a reduced cylindrical member 13 or smaller sleeve upon which a comparatively short ring or sleeve 14 is adapted to slide.

Figure 2:
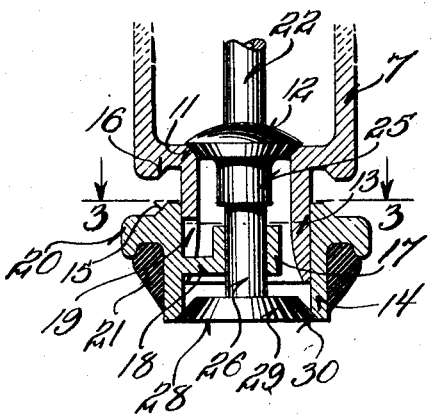
Figure 2 is a view of the lower end of the bottle after the filler has risen and the filling has ceased.
Figure 3:
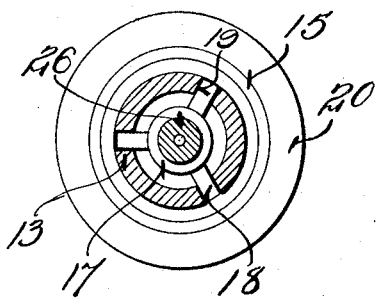
Figure 3 is a transverse sectional view on the line 3—3 of Figure 2.

It is to be noted that the ring 14 is provided with beveled valve faces 15 on its upper end which cooperate with correspondingly beveled faces 16 formed at the lower portion of the main body of the sleeve 7. This ring 14 is provided with a central hub 17 joined to the peripheral portion by means of three or more arms 18. The reduced sleeve 13 is provided with corresponding slots 19 adapted to receive the arms 18 and to permit relative sliding motion of the ring or sleeve 14 and the portion 13. The ring 14 is provided with an overhanging recessed part 20 which receives a tapered gasket 21 of rubber or other material, as shown in Figures 1 and 2. This gasket is adapted to fit within the neck of the bottle, as shown in Figure 1, and to completely seal the upper end of such bottle.

The main valve 12 is carried by means of a tubular stem 22 which projects upwardly and is provided with a central aperture 23 for the escape of air trapped in the bottle. This stem is preferably guided by means of one or more spiders 24 slidably fitted within the stationary sleeve 1. The stem 22 is extended downwardly below the valve 12 and is provided with an enlarged portion 25 and with a reduced portion 26 thus forming a shoulder at the bottom edge of the enlarged portion. The extreme end 27 of the stem is threaded and receives the spreader. This spreader 28, it will be noted is provided with a beveled face 29 and the lower portion of the ring 14 is similarly beveled, as indicated at 30, so that when the ring 14 is in its lowermost position, its beveled face 30 engages the beveled face 29 of the spreader and closes the lower end of the ring thus preventing leaking or spilling of the milk trapped in the valve portion of the filler, as shown in Figure 2.

The operation of the apparatus is as follows:—The bottles 2' are fed in any suitable manner, as described in my copending application, for instance, below the fillers.

Thereafter, the actuating member moves downwardly and its lugs 10 carry the slidable sleeve 7 downwardly. The gasket 21 contacts with the upper end of the bottle and seals such bottle. Further downward motion of the sleeve 7 forces the ring upwardly relative to the sleeve and as the ring travels upwardly on the sleeve the hub 17 engages the face of the enlarged portion 25 of the stem 22 and thus holds the valve 12 and allows the seat to move downwardly thus permitting milk to flow. At the same time the ring 14 has moved away from the spreader and consequently milk flows freely into the bottle and is deflected by the spreader in an annular sheet against the sides of the bottle, the trapped air passing upwardly through the stem 22.

It is to be particularly noted that the beveled face 15 of the ring 14 seats against the beveled face 16 of the sleeve 7 and thus prevents any possibility of leaking although wear may have occurred between the ring 14 and the reduced portions 13 of the movable sleeve.

When the movable sleeve 7 is raised the valve 12 seats. Thereafter, the continued motion of the valve upwardly causes the ring 14 to seat against the spreader, as shown in Figure 2. This action occurs prior to the elevating of the gasket 21 out of contact with the bottle as the ring 14 and the valves controlled thereby are actuated and controlled wholly from the bottle itself.

It will be seen, therefore, that an extremely rapid and effective filling of the bottle is had by this mechanism and that leaking, spraying or other undesirable results are wholly avoided. It will further be seen that no frothing or foaming can occur and that the escaping air will not entrain any spray of milk or foam as the outlet for the air is within the annular sheet of incoming milk.

It will further be seen that the device may be most easily dismantled as each filler is a separate entity and further that the parts may be kept in a sanitary condition with the greatest ease.

It is also to be noted that variation in the height of the bottle which occurs frequently in actual practice cannot cause leaking of the milk as the actual filling is controlled directly from the bottle and as all parts of the apparatus are completely sealed both during filling and after filling.

It is to be noted further that although the filler accomplishes a great number of very desirable results that, nevertheless it is simple, rugged, and may be cheaply produced.

Although the invention has been described in considerable detail, it is to be understood that the invention may be variously embodied and is, therefore, to be limited only as claimed.

I claim:

1. The combination of a vat, a sleeve rigidly secured thereto, a movable sleeve slidably mounted upon said stationary sleeve, a valve normally closing the lower end of said movable sleeve, a ring surrounding the lower end of said movable sleeve and adapted to be actuated by a bottle and having means for engaging said valve to open said valve, said ring and said movable sleeve having cooperating valve faces adapted to close when said valve is open.

2. The combination of a vat, a sleeve rigidly secured thereto, a movable sleeve slidably mounted upon said stationary sleeve, a valve normally closing the lower end of said movable sleeve, a ring surrounding the lower end of said movable sleeve and adapted to be actuated by a bottle, and to actuate said valve, said ring and said movable sleeve having cooperating valve faces adapted to close when said valve is open, and a flexible gasket surrounding said ring and adapted to seal and rest upon the neck of the bottle.

3. The combination of a stationary vat, a sleeve rigidly secured thereto and extending downwardly therefrom, a slidable sleeve mounted upon said stationary sleeve and having a contracted lower portion provided with a valve seat, a main valve cooperating with said valve seat and having a downwardly extending stem, a ring surrounding said contracted portion and having a spider hub whose arms extend through said contracted portion, said hub being adapted to engage said valve stem to actuate said valve when said ring is held and said slidable sleeve is moved downwardly, means carried by said ring for engaging and sealing the upper end of a bottle, and valve faces formed on the lower portion of said movable sleeve and said ring and adapted to contact when said ring is held and said movable sleeve is lowered.

4. The combination of a stationary vat, a sleeve rigidly secured thereto and extending downwardly therefrom, a slidable sleeve mounted upon said stationary sleeve and having a contracted lower portion provided with a valve seat, a main valve cooperating with said valve seat and having a downwardly extending stem, a ring surrounding said contracted portion and having a spider hub whose arms extend through said contracted portion, said hub being adapted to engage said valve stem to actuate said valve when said ring is held and said slidable sleeve is moved downwardly, means carried by said ring for engaging and sealing the upper end of a bottle, and valve faces formed on the lower portion of said movable sleeve and said ring, and adapted to contact when said ring is held and said movable sleeve is moved downwardly, said valve stem being hollow to permit the escape of air, and a spreader carried by the lower end of said valve stem and adapted to direct liquid against the interior walls of a bottle during filling.

5. The combination of a vat, a stationary sleeve rigidly secured thereto, a slidable sleeve cooperating with said stationary sleeve and having a valve seat adjacent its lower end and a downwardly extending portion, a main valve cooperating with said valve seat and having a hollow stem, a ring carried by said downwardly extending portion, a plurality of arms extending inwardly from said ring through said downwardly extending portion and terminating in a central hub adapted to actuate said main valve, said ring and said movable sleeve having cooperating valve faces, and a spreader carried by the lower end of said stem.

6. The combination of a vat, a stationary sleeve rigidly secured thereto, a slidable sleeve cooperating with said stationary sleeve and having a valve seat adjacent its lower end and a downwardly extending portion, a main valve cooperating with said valve seat and having a hollow stem, a ring carried by said downwardly extending portion, a plurality of arms extending inwardly from said ring through said downwardly extending portion and terminating in a central hub adapted to actuate said main valve, said ring and said movable sleeve having cooperating valve faces, and a spreader carried by the lower end of said stem, said spreader and said ring having cooperating valve faces adapted to close when said ring is in its lowermost position.

7. The combination of a vat, a stationary sleeve rigidly secured thereto, a slidable sleeve cooperating with said stationary sleeve and having a valve seat adjacent its lower end and a downwardly extending portion, a main valve cooperating with said valve seat and having a hollow stem, a ring carried by said downwardly extending portion, a plurality of arms extending inwardly from said ring through said downwardly extending portion and terminating in a central hub adapted to actuate said main valve, said ring and said movable sleeve having cooperating valve faces, and a spreader carried by the lower end of said stem, and a piston ring carried by said stationary sleeve and cooperating with said movable sleeve.

In testimony that I claim the foregoing I have hereunto set my hand at Milwaukee, in the county of Milwaukee and State of Wisconsin.

GEORGE A. FULLIPS.